June 19, 1923.

A. WETZIG 1,459,007

FISH DRESSING TOOL

Filed Dec. 30, 1921

Inventor
ALFRED WETZIG.

By *William J. Jacobi*

Attorney

Patented June 19, 1923.

1,459,007

UNITED STATES PATENT OFFICE.

ALFRED WETZIG, OF NEW EFFINGTON, SOUTH DAKOTA.

FISH-DRESSING TOOL.

Application filed December 30, 1921. Serial No. 525,869.

*To all whom it may concern:*

Be it known that ALFRED WETZIG, a citizen of the United States, residing at New Effington, in the county of Roberts and State of South Dakota, has invented certain new and useful Improvements in Fish-Dressing Tools, of which the following is a specification.

My invention relates to a fish dressing tool and particularly to a hand tool for skinning and slitting fish, and its object is the provision of a simple and effective device for both skinning and slitting the fish in a single operation or manipulation of the implement.

Figure 1:
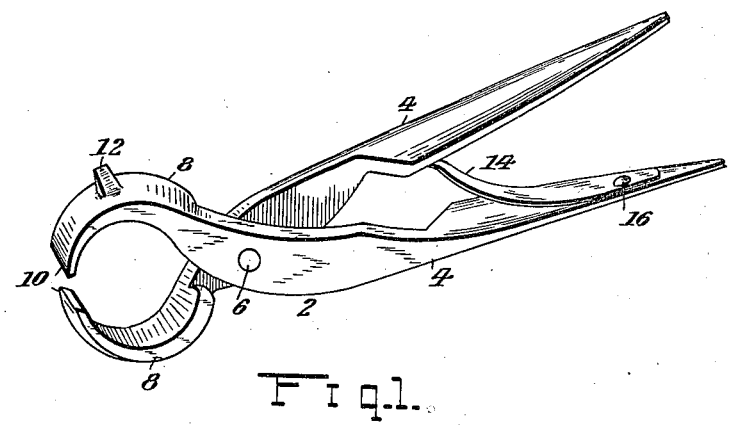
Figure 2:
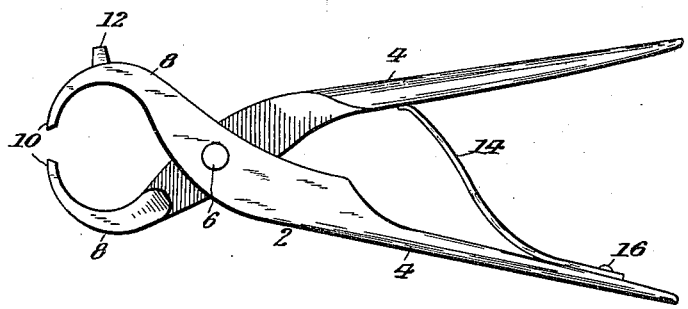

In the accompanying drawings, which form a part of this specification, and in which a preferred construction is illustrated, Figure 1 is a perspective side view of my invention, and Figure 2 is a side elevation thereof.

Referring now more particularly to the figures of the drawing, 2 illustrates generally the tool which comprises a pair of pliers or more especially pinchers having crossed handles 4 pivoted at 6, said handles carrying beyond their pivot the pincher jaws 8 having narrow gripping edges 10.

Integral with and laterally extending from the curved face of one of the jaws 8 is a slitting knife 12, the cutting edge of which lies parallel or in a plane with the handles 6.

A leaf spring 14 rigidly secured at 16 to one of the handles 4 upon its inner face is for the purpose of normally urging said jaws apart.

In operation, the operator holding the tool, grips the fish with the pinchers adjacent and under the neck portion, and at the same time presses the knife into the skin and flesh and exerting a pulling action in the direction of the tail of the fish skins the latter and simultaneously slits the belly so that it may readily be cleaned. While this method is one manner of use of the tool, it may, of course, be used in any other manner to skin or skin and slit the body of the fish.

It is to be further understood that the pincher jaws will grip a portion of the skin adjacent the cut made by the knife and after the tool has been drawn down the full length of the fish, it is pulled transversely to the cut to remove the remainder of the skin on the fish.

Having thus described my invention, what I claim as new and desire to protect by Letters Patent is:

1. In a fish dressing tool, a pair of gripping members, a knife carried on the outer face of one of said gripping members and arranged in close proximity to the gripping edge of said gripping members, said gripping members being adapted to simultaneously remove the skin adjacent the cut made by the downward movement of said knife.

2. A tool for slitting and skinning a fish comprising a pair of skin gripping members, a knife on one of said members in close proximity to the gripping edge of said gripping members, the slitting and skinning occuring simultaneously.

3. In a fish dressing tool, a pair of cross-handled pinchers, having skin gripping jaws with narrow gripping edges and a slitting knife laterally extending from the outer face of one of said jaws adjacent the gripping edge, said gripping jaws being adapted to grip a portion of the skin adjacent the cut made by said knife, the gripping and cutting taking place simultaneously.

4. In a fish dressing tool, a pair of pivoted members having skin gripping jaws with narrow gripping edges, and a slitting knife rigidly mounted on the outer face of one of said jaws, the cutting edge of said knife extending parallel or in alinement with the body of said tool said gripping jaw being adapted to grip a portion of the skin adjacent the cut made by said knife, whereby the skin is simultaneously removed with the cut made by the knife.

In testimony whereof I affix my signature.

ALFRED WETZIG.